United States Patent [19]

Andersson

[11] Patent Number: 4,576,212
[45] Date of Patent: Mar. 18, 1986

[54] DEVICE IN A MACHINE TOOL FOR MAINTAINING A WORKPIECE DISPLACED IN ITS LONGITUDINAL DIRECTION, IN ENGAGEMENT WITH THE TOOL

[75] Inventor: Bengt Andersson, Halmstad, Sweden

[73] Assignee: Waco Jonserreds AB, Halmstad, Sweden

[21] Appl. No.: 588,112

[22] Filed: Mar. 9, 1984

[30] Foreign Application Priority Data

Mar. 15, 1983 [SE] Sweden ............................ 8301382

[51] Int. Cl.[4] ............................................. B27C 5/02
[52] U.S. Cl. ................................... 144/243; 83/431; 144/242 A; 409/226
[58] Field of Search .................... 409/226, 227; 144/242 R, 242 A, 242 B, 243, 249 R, 134 R, 136 R, 114 R; 83/431; 269/20

[56] References Cited

U.S. PATENT DOCUMENTS

| | | | |
|---|---|---|---|
| 702,039 | 6/1902 | Thomas | 144/243 |
| 1,333,710 | 3/1920 | Folsom | 144/243 |
| 1,658,146 | 2/1928 | Vivarttas | 144/243 |
| 2,479,998 | 8/1949 | Bunkovsky | 144/242 B |
| 2,817,376 | 12/1957 | Johannsen | 83/431 |
| 2,971,547 | 2/1961 | Voges et al. | 144/242 B |

FOREIGN PATENT DOCUMENTS 64294 9/1892 Fed. Rep. of Germany ...... 144/243

Primary Examiner—W. D. Bray
Attorney, Agent, or Firm—Barnes, Kisselle, Raisch, Choate, Whittemore & Hulbert

[57] ABSTRACT

A device in a machine tool for maintaining a workpiece which is being worked during displacement in the longitudinal direction, in engagement with the tool. The device consists of a first pair of rigidly interconnected arms which, at one end, are pivotally connected to first ends of a second pair of rigidly interconnected arms and, at the other end, are pivotally mounted on the machine frame. The other ends of the arms of the second pair are pivotally mounted on a pressure plate, all pivot shafts of the arms extending parallel to the direction of movement of the workpiece. Above the arm arrangement, a shaft extending in parallel with the working plane of the machine and perpendicularly to the direction of movement of the workpiece is vertically adjustably fixed on the machine frame. A piston and cylinder assembly is adjustably mounted on said shaft. The piston rod of the piston and cylinder assembly is connected to the pressure plate by means of a pivot shaft perpendicular to the direction of movement of the workpiece, and a bearing element pivotable transversely of the direction of movement of the workpiece.

6 Claims, 1 Drawing Figure

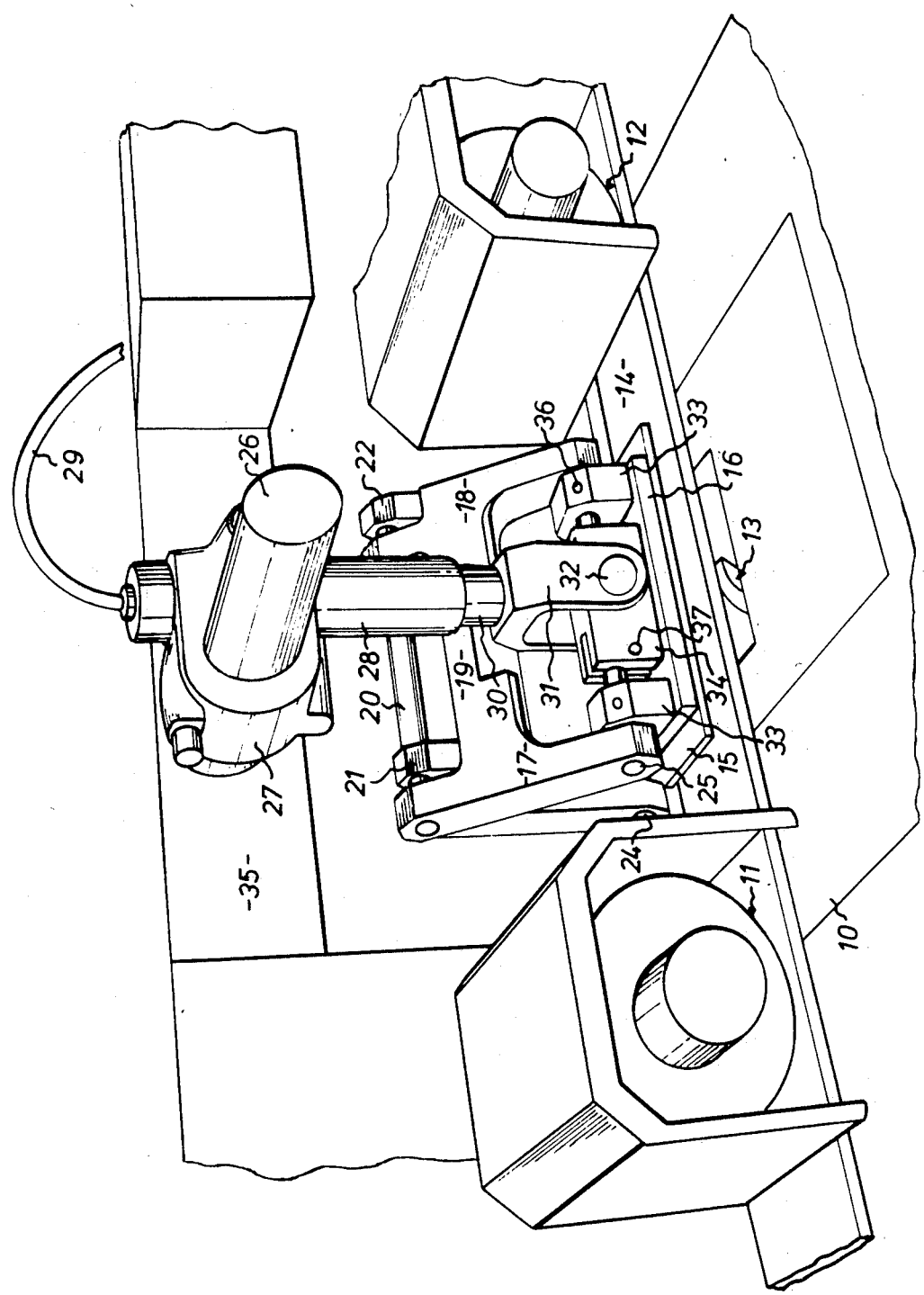

DEVICE IN A MACHINE TOOL FOR MAINTAINING A WORKPIECE DISPLACED IN ITS LONGITUDINAL DIRECTION, IN ENGAGEMENT WITH THE TOOL

The present invention relates to a device in a machine tool for maintaining a workpiece which is displaced in its longitudinal direction, in engagement with the tool, which device comprises a pressure plate and an assembly which, in the direction of the tool, exerts a pressure on the pressure plate on the side thereof facing away from the tool.

In the working of boards, e.g. when planing or milling them in a machine in which the boards are fed in their longitudinal direction over a tool, such as a cutter or miller disposed in an opening in the work table, by means of one pair of driving rollers on either side of the tool, and maintained against the tool by means of a pressure plate located above the tool between the pairs of driving rollers, a major problem encountered especially when feeding the boards one by one is that the pressure plate will press the end of the board downwards against the tool in an exaggerated manner when only one of the pairs of driving rollers and the pressure plate engage the board, because the pressure plate will tilt in the direction of conveyance of the board as the end of the board passes over the edge of the opening in the work table, whereby the ends of the board will receive a transverse indentation. Such indentations must be removed by cutting the board inwardly of the indented portions, which means not only an additional working operation but also waste of material. The object of the present invention is to provide a pressure plate which will safely hold down the board without any risk of tilting even when only one pair of driving rollers engages the board, such that indentations at the end portions of the board may be obviated. According to the invention, this object is achieved in that two arms rigidly interconnected by an intermediate member are horizontally and vertically adjustably mounted on the machine frame and pivotally connected at one end to the pressure plate, the bearings of said arms on the machine frame being located after each other in the direction of movement of the workpiece, and that the pressure-exerting assembly is horizontally adjustable transversely of said direction of movement and pivotally connected to the pressure plate by means of a bearing shaft extending in said direction of movement.

The invention will be described in greater detail hereinbelow with reference to the accompanying drawing which is a perspective view showing an embodiment of the invention.

In the drawing, there is shown a machine tool which has a table 10 on which a board 14 to be worked is conveyed over a tool 13, e.g. a cutter disposed in an opening in the table, by means of a pair of driving rollers 11, 12 which engage the opposite portions of the board 14 on either side of the tool 13. To maintain the board 14 safely engaged with the tool 13, a pressure plate 15 is maintained in engagement with the upper face of the board 14 with a predetermined pressure.

The pressure plate 15 consists of a steel plate whose lower transverse edges extending transversely of the direction of movement of the board 14 are bevelled or rounded. On its upper face, the plate 15 carries a holder plate 16 which extends throughout the major portion of the length of the plate 15 and is connected thereto by screws. Two arms 17, 18 forming a pair are rigidly interconnected by an intermediate member 19 so as to form a rigid fork. The ends of the arms 17, 18 are pivotally connected by means of a shaft 20 to the ends of a second pair of arms 21, 22 which, like the arms 17, 18, are rigidly interconnected by an intermediate member (not shown) so as to form a second rigid fork. The distal ends of the arms 21, 22 with respect to the arms 17, 18 are pivotally mounted on the machine frame outside the path of movement of the board 14 by means of a bearing element (not shown) and a bearing shaft 24. The distal ends of the arms 17, 18 with respect to the arms 21, 22 are mounted on the bearing element 16 of the pressure plate 15 by means of a shaft 25 extending through a pair of lugs 33, which are formed integrally with the holder plate 16 adjacent a respective end thereof and each of which has at least one locking screw 36 for locking the shaft 25 therein. The shafts 20, 24, 25 all extend in directions parallel to the direction of movement of the board 14. In the drawing, the ends of the arm 18 and the arm 21 engaging the arms 22 and 17, respectively, are slightly offset inwardly so as to form recesses in which the ends of the arm 22 and the arm 17, respectively, are located. The arms 17, 18 and 21, 22 with their respective intermediate member may of course be designed in many different ways. Preferably, the pair of arms 17, 18 with the intermediate member 19 is designed in the same manner as the pair of arms 21, 22 with its intermediate members, this rationalizing production. It will be appreciated from the drawing that the plate 15 can be imparted a parallel displacement in the transverse direction of the board 14 by means of the arm arrangement.

Above the arrangement now described, a shaft 26 is rigidly mounted in a beam 35 which in a suitable conventional manner is vertically movable with respect to the machine frame. As seen from the drawing, the shaft 26 extends parallel to the machine table and transversely of the direction of movement of the board 14. A clamping element 27 which is mounted on the shaft 26 encloses the shaft and is fixable thereon in a desired position by means of bolts. The clamping element 27 carries a piston and cylinder assembly 28 which extends in the vertical direction and is connected by a pressure hose 29 to a suitable source of pressure medium. At its free end, the piston rod 30 of the assembly 28 has a fork-shaped portion 31 which straddles a bearing element 34 mounted on the shaft 25 extending through the lugs 33 of the holder plate 16. The portion 31 is pivotally connected to the bearing element 34 by means of a bearing shaft 32 which extends transversely of the shaft 25 and is mounted in a transverse opening provided in the bearing element 34 underneath the shaft 25. The bearing element 34 is lockable on the shaft 25 by means of at least one pair of locking screws 37. It will be understood that the pressure plate can be placed in a suitable location transversely of the direction of movement of the board 14 by loosening, shifting and again fastening the clamping element 27 to the shaft 26. The piston and cylinder assembly 28 is supplied with pressure medium exerting such a pressure that the pressure plate connected thereto will be pressed against the board 14 with a suitable pressure. For adjustment to the board thickness, the beam 35 is shifted in the vertical direction.

The device according to the invention provides means for safely maintaining a single board 14 in engagement with the tool 13 and preventing the end of the board from being pressed down against the tool also when only one of the pairs of driving rollers is engaging the board and its end passes over the tool opening in the work table, since the arm arrangement will prevent the plate 15 from tilting in the longitudinal direction. Because of the mounting of the arms 17, 18 on the plate 15 by means of the shaft 25 and the lugs 33 and because of the engagement of the fork-shaped portion 31 with the shaft 25 through the bearing element 34, the plate 15 can be inclined in the transverse direction and, hence, be adapted to boards having an oblique upper face. To this end, either the screws 36 in the lugs or the screws 37 in the bearing element 34 are loosened and tightened again once the adjustment has been made.

Although the invention has been described with reference to wood working, where it is particularly useful, it may of course also be used in the working of other materials, such as metal or plastic.

What I claim and desire to secure by Letters Patent is:

1. In a machine tool a device for maintaining a workpiece which is displaced in its longitudinal direction in engagement with the tool, comprising in combination
    a machine frame,
    a pressure plate,
    two arms,
    said arms being rigidly interconnected by an intermediate member, means for horizontally and vertically adjustably mounting the arms on the machine frame comprising a bearing means on the machine frame mounting said arms about an axis extending in the direction of movement of the workpiece,
    said arms being pivotally connected at one end to said pressure plate,
    a first bearing shaft on said pressure plate extending in said direction of movement, and
    a pressure-exerting assembly,
    said assembly being horizontally adjustable mounted on said frame transversely of said direction of movement and pivotally connected to said pressure plate by means of said bearing shaft to exert a pressure on said pressure plate on the side thereof facing away from the tool.

2. The device as claimed in claim 1, comprising two further arms pivotally mounting said two arms on the machine frame, said further arms being rigidly interconnected and, at one end, pivotally connected to the machine frame about an axis extending in the direction of movement of the workpiece and, at the other end, pivotally connected to said first-mentioned arms by means of a second bearing shaft.

3. The device as claimed in claim 2, comprising a holder plate on the side of the pressure plate facing away from the tool, and projecting lugs on said holder plate, said projecting lugs being formed integrally with the holder plate and located in spaced relation in the direction of movement of the workpiece, each of said lugs having a bore for acommodating said first bearing shaft which is lockable therein by means of at least one locking screw.

4. The device as claimed in claim 3, wherein said pressure assembly consists of a piston and cylinder assembly whose piston rod engages a bearing element mounted on said first bearing shaft between said two lugs and lockable thereon by means of locking screws.

5. The device as claimed in claim 4, wherein said piston and cylinder assembly is adjustable mounted on a shaft connected to the machine frame and located above said arm arrangement and extending in parallel with the working plane of the machine perpendicularly to the direction of movement of the workpiece.

6. The device as claimed in claim 5, wherein aid piston and cyliner assembly engages said bearing element by a fork-shaped portion of the piston rod straddling the bearing element and connected thereto by means of a shaft which is mounted in a bore in the bearing element extending transversely of said direction of movement.

* * * * *